W. Smith,
Fly Trap.
No. 99,402.   Patented May 25, 1869.
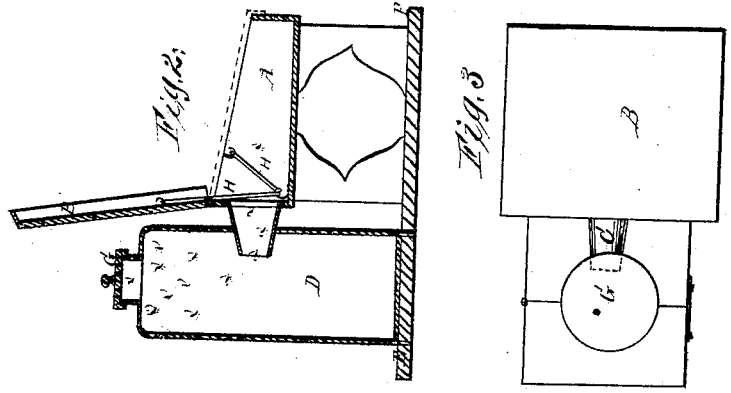
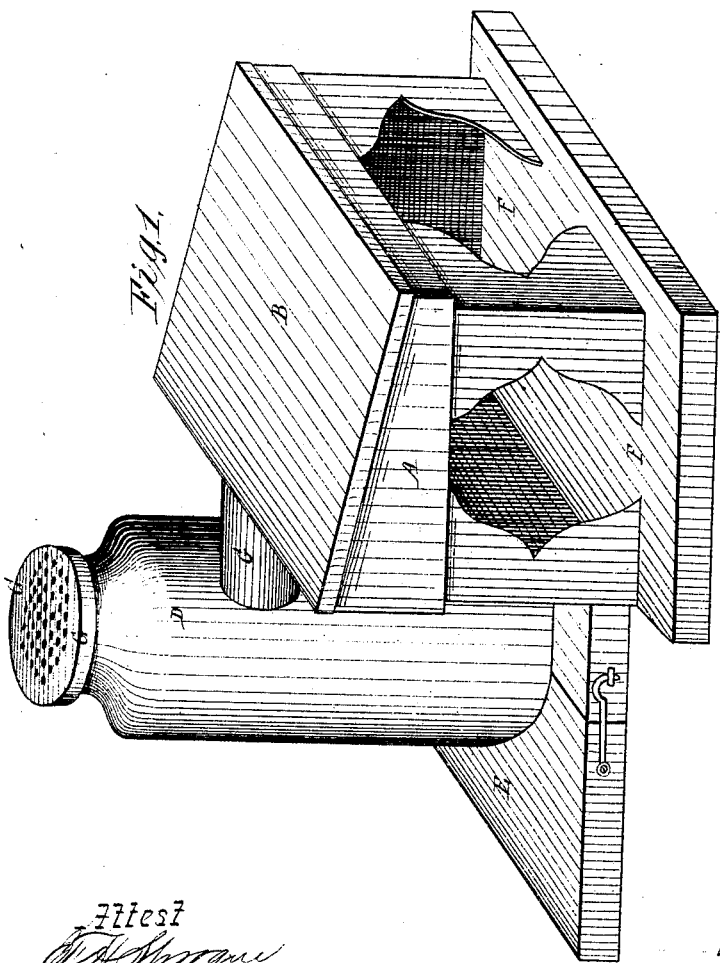
Attest
F. H. Sprague
C. F. Clausen
W. Smith
Inventor
D. P. Holloway
Atty

United States Patent Office.

WARREN SMITH, OF ALEXANDRIA, INDIANA.

Letters Patent No. 90,402, dated May 25, 1869.

IMPROVED FLY-TRAP.

The Schedule referred to in these Letters Patent and making part of the same.

*To all whom it may concern:*

Be it known that I, WARREN SMITH, of Alexandria, in the county of Madison, and State of Indiana, have invented a new and useful Improvement in Fly-Traps; and I do hereby declare that the following is a full, clear, and exact description of the same, reference being had to the annexed drawings, making part of this specification, in which—

Figure 1 is a perspective view of my improved trap;

Figure 2 is a central sectional elevation of the same; and

Figure 3 is a top view.

Corresponding letters refer to corresponding parts in the several figures.

This invention relates to an improvement in that class of instruments denominated fly-traps; and It consists in the combination and arrangement of the parts of which it is composed, as will be more fully described hereafter.

A represents a chamber, which is to be mounted upon any suitable support, said support resting against base, F, and being of sufficient height to allow the conduit, or passage which leads from the chamber to a transparent vessel, to enter said vessel at a point about two-thirds of the distance between the bottom and the top thereof.

B represents a hinged cover to the chamber A, which is to be so arranged, that, when open, it shall leave the entire contents of the chamber exposed to the flies, and give them ready access thereto.

C is a pipe, or conduit, which leads from the chamber A to the transparent vessel D.

D is a transparent vessel, which is to be secured to or upon the base, E, said vessel being designed as a receptacle for the flies to escape into from the chamber A, when the lid B has been closed down, they being attracted thither by the light which passes through the walls thereof.

E is the platform, or base, upon which the device rests, that portion which secures the transparent vessel being shown as hinged to the other portion, in such a manner, that it may be made to enclose the lower portion of the vessel, and thus retain the vessel in its proper position with reference to the conduit C.

F is the base upon which the chamber with its supports rests.

G is a perforated cover to the transparent vessel, said cover being made of metal, and perforated with a series of holes, for the admission of air thereto.

H is a rubber spring, which is to be attached to the cover B of the reservoir, and to the reservoir itself, as shown in fig. 2, and in such a manner, that as the cover is thrown up to, or slightly past a vertical position, the spring will be elongated to such an extent, as that, upon receiving a slight touch from the hand, or in any other manner, the lid will be instantaneously closed, by the contraction of such spring, and the blast of air caused thereby will have a tendency to drive any flies which may be in the reservoir at the time, into the transparent vessel, which is to be filled nearly to a level with the lower portion of the connecting-conduit, with soap-suds, or any other liquid which will drown or destroy the flies as they pass into it.

Should any flies remain in the feed-chamber, after the lid has been closed, they will at once be attracted to the vessel by the light which will shine through the same, and through the conduit into the feed-chamber, after which the lid is again to be raised, when the flies remaining in the room will enter the feed-chamber, and the operation above described may be again repeated.

The feed-chamber may be supplied with a small quantity of sugar, or of molasses, or any other substance which will attract the flies, and cause them to gather therein in larger quantities.

Having thus described my invention,

What I claim, and desire to secure by Letters Patent, is—

1. The combination of the transparent vessel D, the conduit C, and feed-chamber A, substantially as shown and described.

2. In combination with the feed-chamber A and its cover B, the spring H, arranged substantially as and for the purpose described.

In testimony whereof, I have signed my name to this specification, in the presence of two subscribing witnesses.

WARREN SMITH.

Witnesses:
JOHN A. HARRISON,
HARRY DAVIS.